US012695796B2

(12) United States Patent
Amin et al.

(10) Patent No.: US 12,695,796 B2
(45) Date of Patent: Jul. 28, 2026

(54) FAILURE HANDLING FOR MISSING SESSION PARAMETERS

(71) Applicant: T-Mobile USA, Inc., Bellevue, WA (US)

(72) Inventors: Rahul Amin, Issaquah, WA (US); Ting-chun Kang, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 36 days.

(21) Appl. No.: 18/776,232

(22) Filed: Jul. 17, 2024

(65) Prior Publication Data

US 2026/0025417 A1 Jan. 22, 2026

(51) Int. Cl.
*H04L 65/1069* (2022.01)
*H04L 43/0805* (2022.01)

(52) U.S. Cl.
CPC ...... *H04L 65/1069* (2013.01); *H04L 43/0805* (2013.01)

(58) Field of Classification Search
CPC ........................ H04L 65/1069; H04L 43/0805
USPC ........................................................ 709/227
See application file for complete search history.

(56) References Cited

U.S. PATENT DOCUMENTS

2022/0038869 A1* 2/2022 Avetoom .............. H04W 12/71
2025/0193737 A1* 6/2025 Krishan ................ H04W 48/18

FOREIGN PATENT DOCUMENTS

CN 120614628 A * 9/2025 ............ H04W 24/04
WO 2020169080 A1 8/2020
WO WO-2024246342 A1 * 12/2024 .......... H04W 60/005

OTHER PUBLICATIONS

International Search Report mailed on Oct. 6, 2025, in International Application No. PCT/US2025/034848, 11 Pages.
Samsung: "KI #3A, New Sol: Supporting deterministic communication," 3GPP, Jun. 1-12, 2020, 4 Pages.

* cited by examiner

*Primary Examiner* — Glenford J Madamba
(74) *Attorney, Agent, or Firm* — Foley IP Law, PLLC

(57) ABSTRACT

Solutions are disclosed that provide failure handling for missing session parameters in wireless network messaging. When a service-based interface (SBI) message received by a control plane node, such as a session management function (SMF), is missing a session parameter (e.g., allocation and retention priority (ARP) or bandwidth value), rather than responding with a rejection, failure handling fills in the missing parameter using pre-configured tables. The type of received message, along with another parameter in the message, such as a QoS identifier, is used in a mapping table to identify a default value to supply as the missing parameter. This approach may be used in other network messages in which certain parameter values are commonly used together in particular types of messages, such as the given example of QoS identifier, ARP value, and bandwidth value.

19 Claims, 11 Drawing Sheets

FIG. 2

SESSION MGMT. NODE  114

MESSAGE  200

```
},
"qosDecs" : {
"qosId-e3e-1" : {
"qosId" : "qosId-e3e-1",
"5qi" : 1,
"maxbrUl" : "38 Kbps",
"maxbrDl" : "38 Kbps",
"gbrUl" : "38 Kbps",
"gbrDl" : "38 Kbps"
},
"qosId-ahh-0" : {
"qosId" : "qosId-ahh-0",
"5qi" : 1,
"maxbrUl" : "2 Kbps",
"maxbrDl" : "2 Kbps",
"gbrUl" : "2 Kbps",
"gbrDl" : "2 Kbps"
}
},
"chgDecs" : {
"chgId-e3j-0" : {
"chgId" : "chgId-e3j-0",
"offline" : false,
"online" : false,
"ratingGroup" : 200,
"reportingLevel" :
"RAT_GR_LEVEL",
"serviceId" : 0,
"afChargingIdentifier" :
1952984674
```

310

MISSING:

SESSION  210
PARAMETER

FAILURE      300
HANDLER

VALUE    212

MESSAGE      202

SESSION      210
PARAMETER

VALUE    212

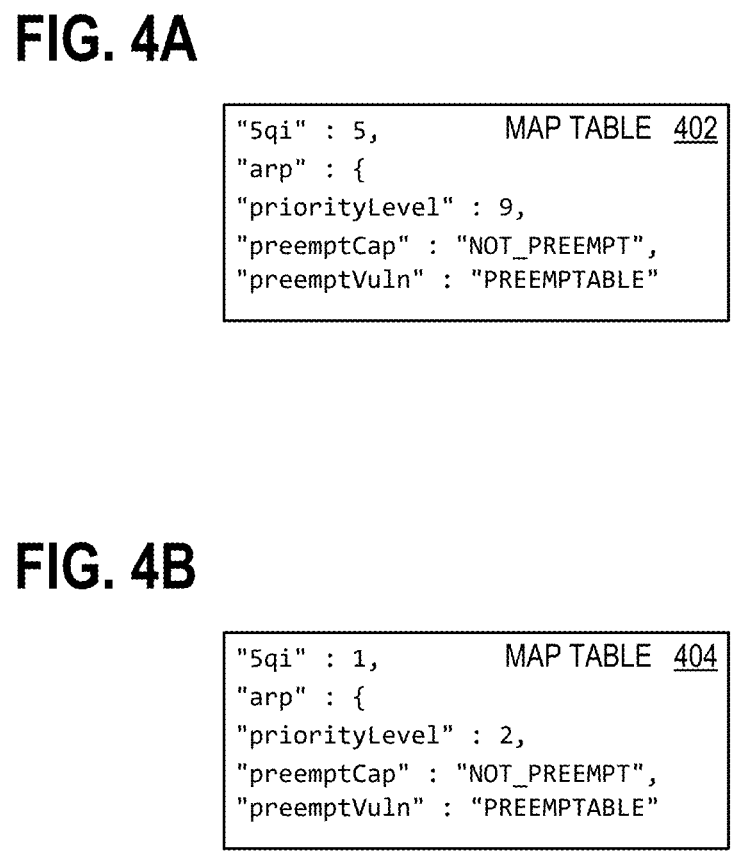

```
"5qi" : 5,              MAP TABLE  402
"arp" : {
"priorityLevel" : 9,
"preemptCap" : "NOT_PREEMPT",
"preemptVuln" : "PREEMPTABLE"
```

FIG. 4B

```
"5qi" : 1,              MAP TABLE  404
"arp" : {
"priorityLevel" : 2,
"preemptCap" : "NOT_PREEMPT",
"preemptVuln" : "PREEMPTABLE"
```

FIG. 4C

```
"5qi" : 130,        MAP TABLE  406
"arp" : {
"priorityLevel" : 12,
"preemptCap" : "NOT_PREEMPT",
"preemptVuln" : "PREEMPTABLE"
  MaxbrUl: 20 Mbps
  MaxbrDl: 20 Mbps
  GbrUl: 20 Mbps
  GbrDl: 20 Mbps
```

FIG. 4D

```
"5qi" or Qci: 1-255MAP TABLE  408
"arp" : {
"priorityLevel" : 9,
"preemptCap" : "NOT_PREEMPT",
"preemptVuln" : "PREEMPTABLE"
  MaxbrUl: as defined by SMF/PGW
local profile  or "0"
  MaxbrDl: as defined by SMF/PGW
local profile  or "0"
  GbrUl: as defined by SMF/PGW
local profile  or "0"
  GbrDl: as defined by SMF/PGW
local profile  or "0"

SMF/PGW Local Profile:
  MaxbrUl: 4294967 Kbps
  MaxbrDl: 4294967 Kbps
  GbrUl: 0
  GbrDl: 0
```

START

800

REQUEST USER PLANE SESSION                                    802

EARLY SESSION SETUP TRAFFIC                                   804

1ST CONTROL PLANE NODE RECEIVES 1ST MESSAGE       806

DETERMINE SESSION PARAMETER IS MISSING              808

DETERMINE VALUE FOR MISSING SESSION PARAMETER     810
    USE MAPPING TABLE                                        812

GENERATE 2ND MESSAGE WITH DETERMINED VALUE          814

1ST NODE TRANSMITS 2ND MESSAGE                        816

ESTABLISH USER PLANE SESSION                             818

CARRY UE TRAFFIC OVER USER PLANE SESSION            820

DONE

Figure 9:
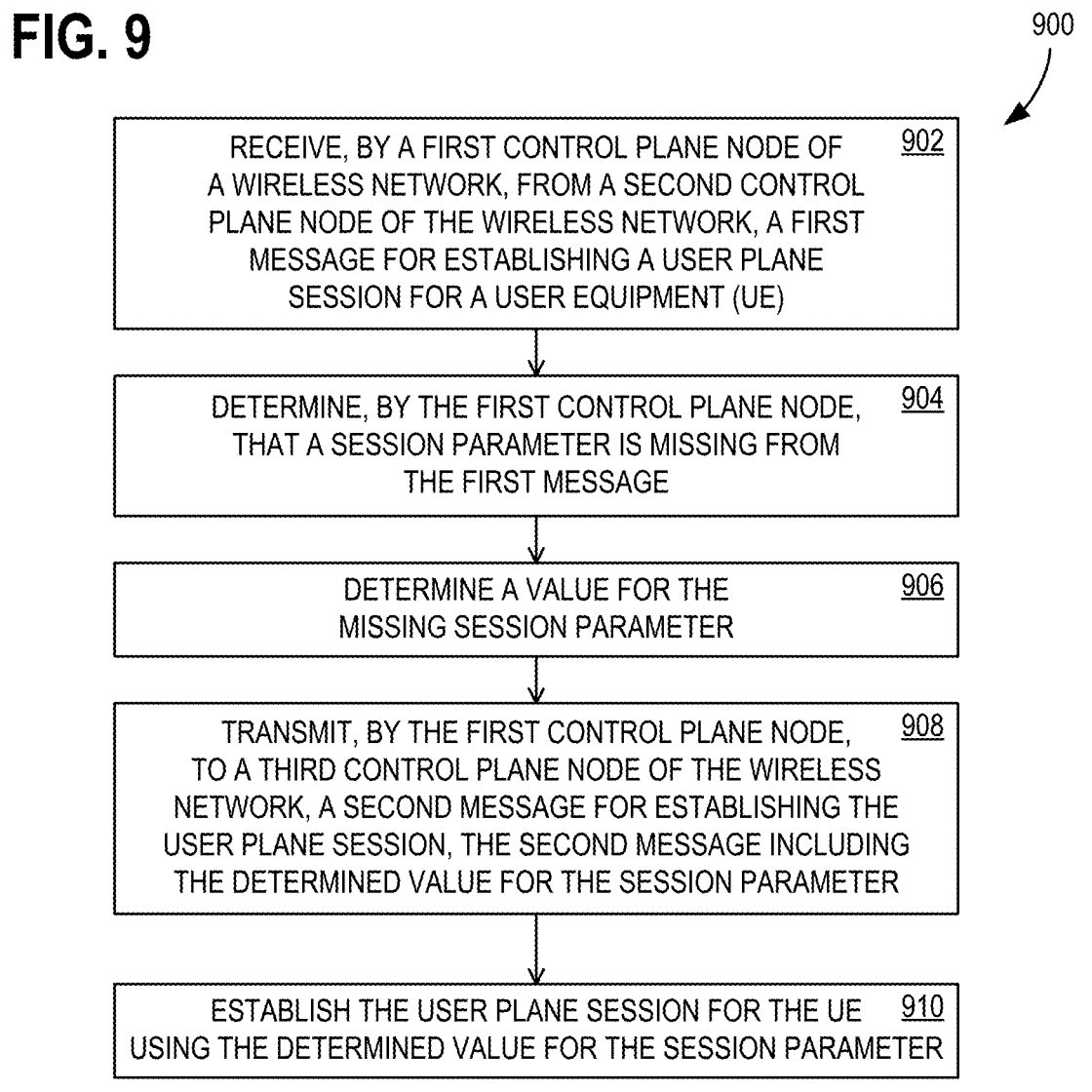

RECEIVE, BY A FIRST CONTROL PLANE NODE OF    902
A WIRELESS NETWORK, FROM A SECOND CONTROL
PLANE NODE OF THE WIRELESS NETWORK, A FIRST
MESSAGE FOR ESTABLISHING A USER PLANE
SESSION FOR A USER EQUIPMENT (UE)

DETERMINE, BY THE FIRST CONTROL PLANE NODE,    904
THAT A SESSION PARAMETER IS MISSING FROM
THE FIRST MESSAGE

DETERMINE A VALUE FOR THE    906
MISSING SESSION PARAMETER

TRANSMIT, BY THE FIRST CONTROL PLANE NODE,    908
TO A THIRD CONTROL PLANE NODE OF THE WIRELESS
NETWORK, A SECOND MESSAGE FOR ESTABLISHING THE
USER PLANE SESSION, THE SECOND MESSAGE INCLUDING
THE DETERMINED VALUE FOR THE SESSION PARAMETER

ESTABLISH THE USER PLANE SESSION FOR THE UE    910
USING THE DETERMINED VALUE FOR THE SESSION PARAMETER

FAILURE HANDLING FOR MISSING SESSION PARAMETERS

BACKGROUND

The architecture of fifth generation (5G) cellular networks uses a service-based architecture (SBA) framework, which employs a service-based interface (SBI) between the identified network functions within the 5G control plane. SBI is the term used for application programming interface (API) based communication that occurs between network functions within the 5G SBA. A 5G session attach call flow has many SBI call legs that need to be successful for a successful session attach. Each call leg's success depends on the SBI procedure's specific mandatory parameters. Any processing error or incomplete communication results in call leg failure and possibly a session attach (setup) failure. Session attach failures degrade customer experience and negatively impact network performance.

SUMMARY

The following summary is provided to illustrate examples disclosed herein, but is not meant to limit all examples to any particular configuration or sequence of operations.

Solutions are disclosed that provide failure handling for missing session parameters in wireless networks. Examples receive, by a first control plane node of a wireless network, from a second control plane node of the wireless network, a first message for establishing a user plane session for a user equipment (UE); determine, by the first control plane node, that a session parameter is missing from the first message; determine a value for the missing session parameter; transmit, by the first control plane node, to a third control plane node of the wireless network, a second message for establishing the user plane session, the second message including the determined value for the session parameter; and establish the user plane session for the UE using the determined value for the session parameter.

BRIEF DESCRIPTION OF THE DRAWINGS

The disclosed examples are described below with reference to the accompanying drawing figures listed below, wherein:

FIG. 2 illustrates an exemplary message of that is missing a session parameter, as may occur when using examples of the architecture of FIG. 1;

FIG. 3 illustrates an exemplary failure handler as may be used in examples of the architecture of FIG. 1;

FIGS. 4A, 4B, 4C, and 4D illustrate exemplary mapping tables as may be used in examples of the architecture of FIG. 1;

FIGS. 8 and 9 illustrate flowcharts of exemplary operations associated with the architecture of FIG. 1.

Figure 1:
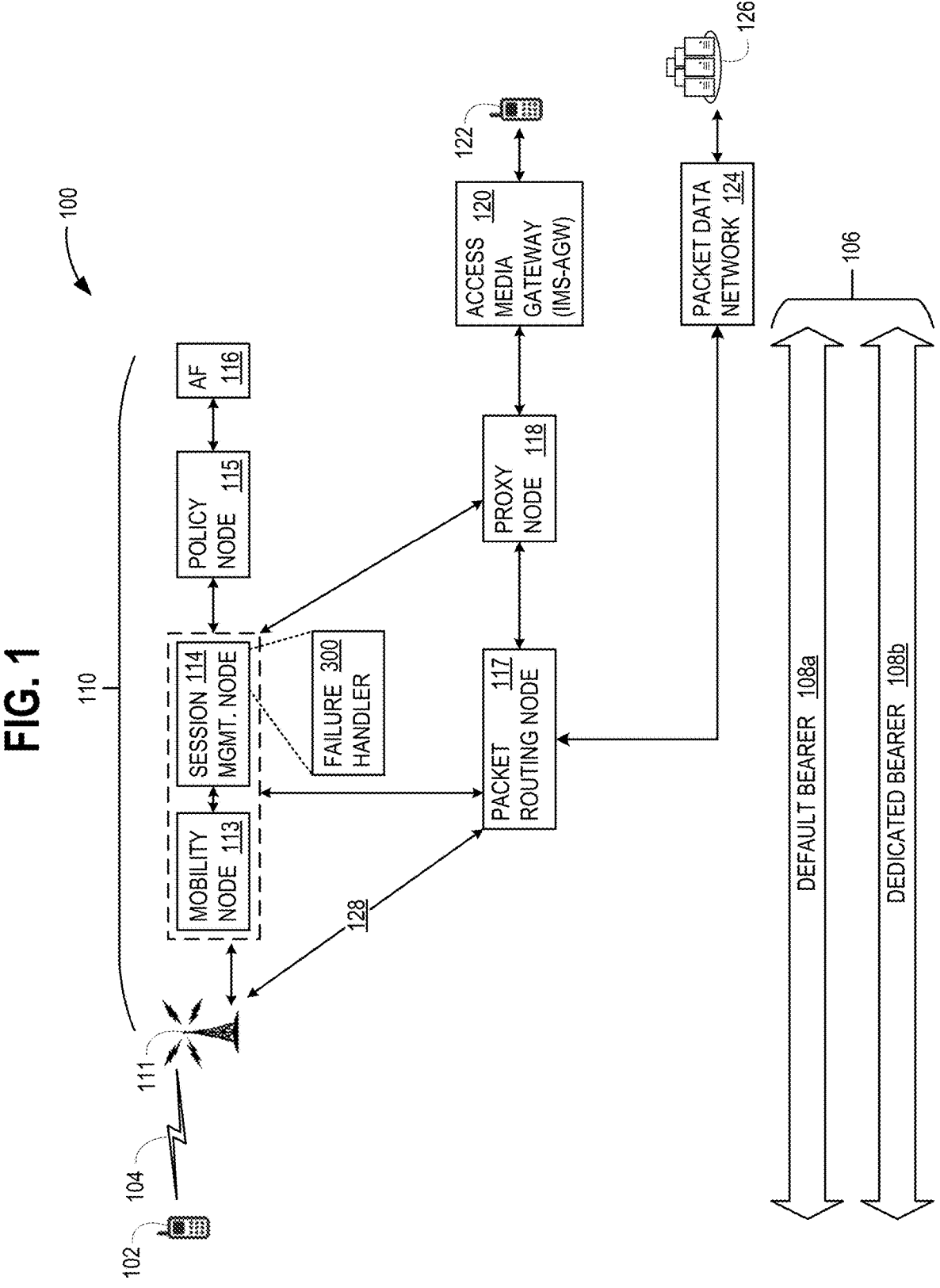
FIG. 1 illustrates an exemplary architecture that advantageously provides failure handling for missing session parameters.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions are disclosed that provide failure handling for missing session parameters in wireless network messaging. When a service-based interface (SBI) message received by a control plane node, such as a session management function (SMF), is missing a session parameter (e.g., allocation and retention priority (ARP) or bandwidth value), rather than responding with a rejection, failure handling fills in the missing parameter using pre-configured tables. The type of received message, along with another parameter in the message, such as a quality of service (QoS) identifier, is used in a mapping table to identify a default value to supply as the missing parameter. This approach may be used in other network messages in which certain parameter values are commonly used together in particular types of messages, such as the given example of QoS identifier, ARP value, and bandwidth value.

Aspects of the disclosure improve the performance of cellular networks by increasing reliability of session creation for user equipment (UEs). This reduces negative impacts on network users when a session parameter is missing from wireless network messaging, such as SBI messages. These advantageous results are accomplished, at least in part by, determining a value for a missing session parameter, and transmitting, by a control plane node, to another control plane node of a wireless network, a message for establishing a user plane session, the message including the determined value for the session parameter.

With reference now to the figures, FIG. 1 illustrates an exemplary architecture 100 that advantageously provides failure handling for missing session parameters in a wireless network 110 that is illustrated as serving a UE 102. UE 102 may be an enhanced Mobile Broadband (eMBB) or cellphone, a fixed wireless access (FWA), internet of things (IoT) device, machine-to-machine (M2M) communication device, a personal computer (PC, e.g., desktop, notebook, tablet, etc.) with a cellular modem, or another telecommunication devices capable of using a wireless network. In the scene depicted in FIG. 1, UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network. In some contexts, 5G is also referred to as new radio (NR), and standalone 5G, which is a full 5G implementation that does not rely on 4G technology for some functionality, may be referred to SA NR.

UE 102 uses an air interface 104 to communicate with a base station 111 of wireless network 110, such that base station 111 is the serving base station for UE 102 (providing the serving cell). In some scenarios, base station 111 may be referred to as a radio access network (RAN). Wireless network 110 has a mobility node 113, a session management node 114, a policy node 115, an application function (AF) 116, and other components (not shown). Wireless network 110 also has a packet routing node 117 and a proxy node 118. Mobility node 113, session management node 114, policy node 115, and AF 116 are within a control plane of wireless network 110, and packet routing node 117 is within a data plane (a.k.a. user plane) of wireless network 110.

Base station 111 is in communication with mobility node 113 and packet routing node 117. Mobility node 113 is in communication with session management node 114, which is in communication with policy node 115, packet routing node 117, and proxy node 118. Policy node 115 is in communication with AF 116. Packet routing node 117 is in communication with proxy node 118 and packet data network 124.

In some 5G examples, base station 111 comprises a gNodeB (gNB), mobility node 113 comprises an access mobility function (AMF), session management node 114 comprises a session management function (SMF), policy node 115 comprises a policy control function (PCF), and packet routing node 117 comprises a user plane function (UPF).

In some 4G examples, base station 111 comprises an eNodeB (eNB), mobility node 113 comprises a mobility management entity (MME), session management node 114 comprises a system architecture evolution gateway (SAEGW) control plane (SAEGW-C), policy node 115 comprises a policy and charging rules function (PCRF), and packet routing node 117 comprises an SAEGW-user plane (SAEGW-U). In some examples, proxy node 118 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

Proxy node 118 is in communication with an internet protocol (IP) multimedia system (IMS) access gateway (IMS-AGW) 120 within an IMS, in order to provide connectivity to other wireless (cellular) networks, such as for a call with a UE 122 or a public switched telephone system (PSTN, also known as plain old telephone system, POTS). In some examples, proxy node 118 may be considered to be within the IMS. UE 102 reaches network resource 126 using packet data network 124 (or the IMS, in some examples). Data packets of data traffic 128 to/from UE 102 pass through at least base station 111 and packet routing node 117 on their way from/to packet data network 124 or IMS-AGW 120 (via proxy node 118).

As described more fully below, in relation to the other figures, a failure handler 300 is able to establish a user plane session 106, comprising a default bearer 108a and/or a dedicated bearer 108b to carry data traffic 128 to/from UE 102, even when certain parameters are missing from a SBI message that is part of the set up process for user plane session 106. This improves the reliability of wireless network 110, as experienced by UE 102.

Although FIG. 1 and some of the following figures are described using an example of a cellular network, it should be understood that the teachings herein are applicable to other types of wireless networks. To benefit from the teachings herein, another type of wireless network should use signaling to set up packet data sessions for UEs, and provide a node within the signaling path that is able to implement failure handling capability similar to that described herein.

With such features, another type of wireless network, other than a cellular network, may also benefit from the disclosure herein.

FIG. 2 illustrates an exemplary message 200 that is missing a session parameter 210 when received by session management node 114, and another exemplary message 202 that includes a value 212, as determined by a failure handler 300, and which is sent along to another control plane node (e.g., mobility node 113) in order to set up user plane session 106 for UE 102. The operation of failure handler 300 is described in further detail below in relation to FIGS. 3 and 4. A QoS identifier 310 is shown within message 200, and its significance to failure handler 300 is also which is also described in further detail below in relation to FIGS. 3 and 4.

As an example, to establish user plane session 106 (a data session) for UE 102, session management node 114 queries policy node 115 regarding QoS parameters for user plane session 106, such as a QoS identifier, and ARP, and bandwidth. In normal network operation, policy node 115 returns all of these values, and session management node 114 then sets up user plane session 106 for UE 102. In the illustrated example, however, either ARP or bandwidth (in some examples, both) is missing and identified as missing session parameter 210. Without the functionality provided by failure handler 300, session management node 114 would return a Protocol Data Unit (PDU) Session Establishment Reject message (in 5G), and would not continue setting up user plane session 106 for UE 102. However, with the functionality provided by failure handler 300, session management node 114 instead continues setting up user plane session 106 for UE 102 returns a PDU Session Establishment Accept message.

Figure 3:
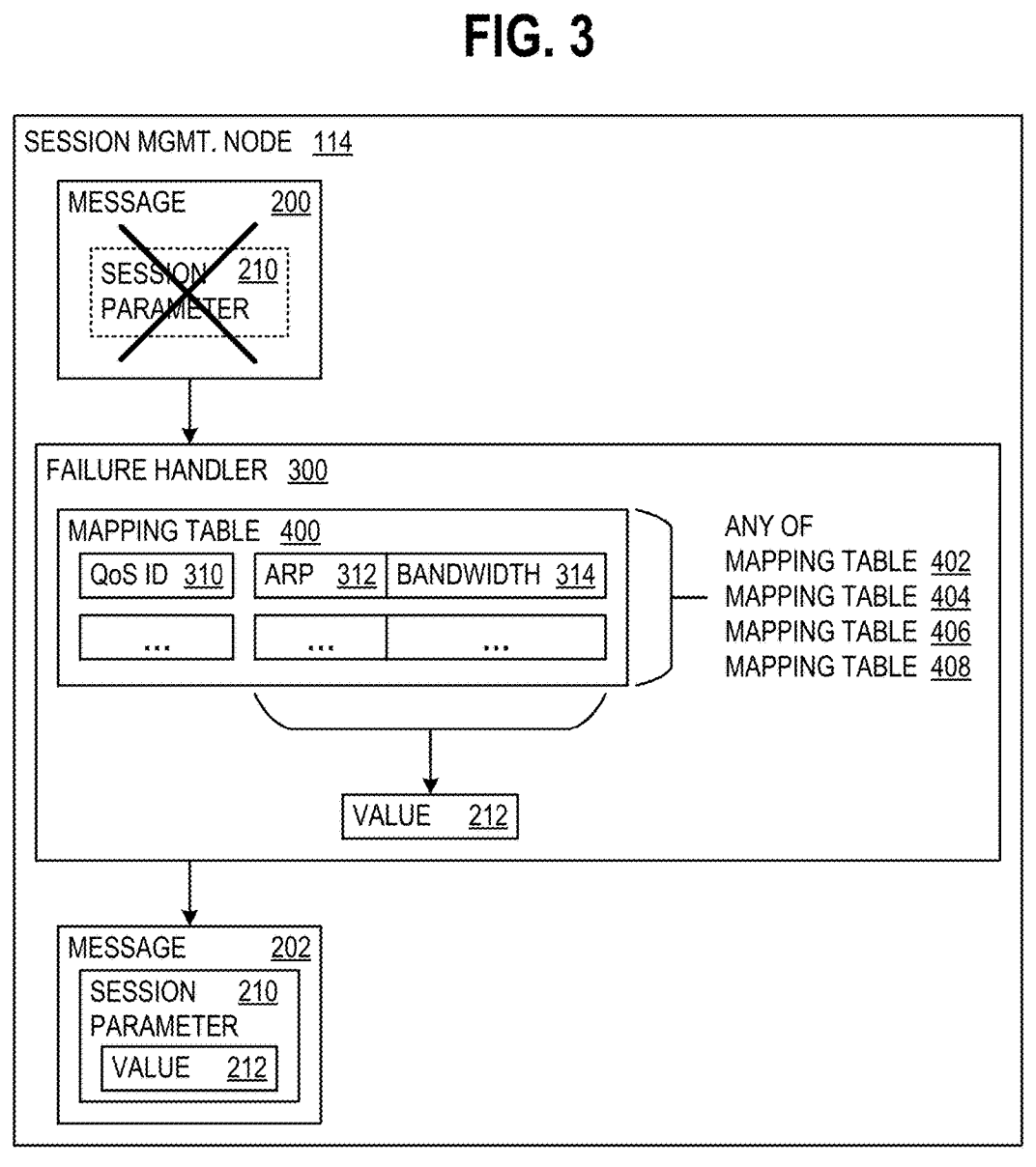

FIG. 3 illustrates further detail for failure handler 300. Failure handler 300 uses a mapping table 400 that maps QoS identifier values, such as QoS identifier 310, to values, such as value 212, for missing session parameter 210. Value 212 may be an ARP value 312, a bandwidth value 314, another QoS parameter, or another parameter used for establishing user plane session 106. In the illustrated example, a simple lookup table is used, although any functionality may be used that permits the identification of one session parameter within message 200 to enable determination of a commonly associated second parameter as value 212.

FIG. 3 further indicates that mapping table 400 is a generic representation for any of a plurality of mapping tables 402-408, with at least some being specific to a type of message 200, as shown in FIGS. 4A, 4B, 4C, and 4D. FIG. 4A shows an exemplary mapping table 402 for when message 200 is an N7 Create Response, which may be used when setting up a default bearer, such as default bearer 108a. In such a case, value 212 is an ARP value with a priority level of 9.

FIG. 4B shows an exemplary mapping table 402 for when message 200 is an N7 Update Notification, which may be used when setting up a dedicated bearer, such as dedicated bearer 108b. In such a case, value 212 is an ARP value with a priority level of 2. FIG. 4C shows an exemplary mapping table 404 for when message 200 is an N7 Update Response, which may be used when setting up a dedicated bearer, such as dedicated bearer 108b. In such a case, value 212 is an ARP value with a priority level of 12. FIG. 4D shows an exemplary mapping table 408 for when message 200 does not specify a 5QI value shown in one of the examples of FIG. 4A-4C. In such a case, value 212 is extracted, based on which specific session parameter value (or values) is missing.

Figure 5:
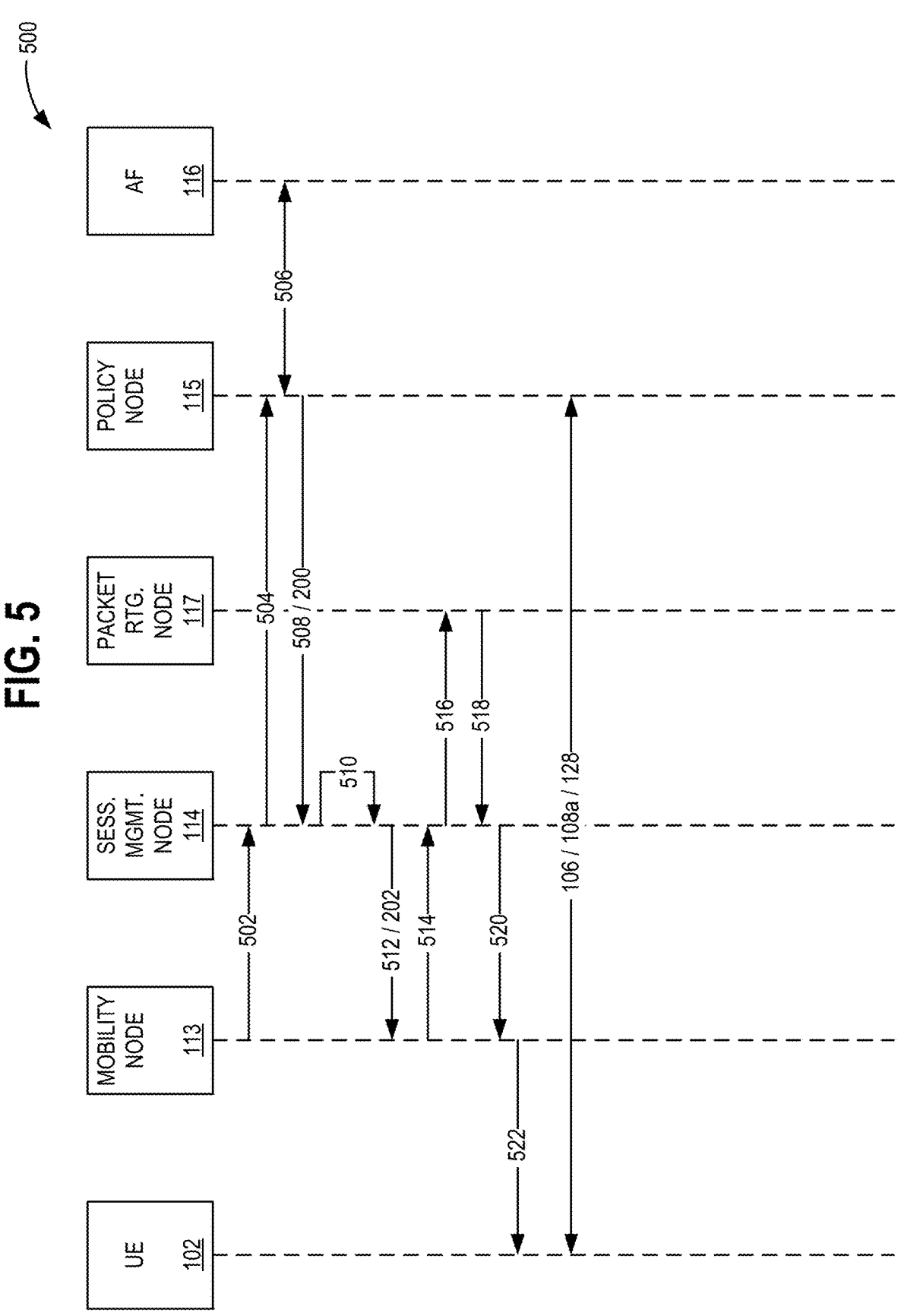
FIGS. 5, 6, and 7 illustrate exemplary message sequence diagrams of messages that may occur in examples of the architecture of FIG. 1.

FIG. 5 illustrates an exemplary message sequence diagram 500 that matches the case of FIG. 4A, in which message 200 is an N7 Create Response. Message sequence diagram 500 commences with message 502 from mobility node 113 to session management node 114, which is/nsmf-pdusession/v1/sm-contexts. Session management node 114 then sends message 504, which is/npcf-smpolicycontrol/v1/sm-policies, to policy node 115. Policy node 115 queries AF 116 for session information, which is shown as message 506. If this communication is interrupted, this may be the cause of session parameter 210 missing. Policy node 115 responds to session management node 114 with message 508, which is message 200 in this scenario, and is/callbacks/v1/smPoliciesUpdateNotification/imsi-<imis>/update.

Session management node 114 uses failure handler 300 in operation 510 to determine value 212. Session management node 114 then sends message 512, which in this scenario is message 202, to mobility node 113 as/namf-comm/v1/ue-contexts/imsi-<imsi>/n1-n2-messages. Message 512 may contain "N1msg:PDU Accept; n2msg{ . . . {5qi:5,arp:{priorityLevel:9,preemptCap:NOT_PREEMPT,preemptVuln:PREEMP TABLE} . . . }". Message 514 from mobility node 113 to session management node 114 represents multiple communications, including 200 OK and/nsmf-pdusession/v1/sm-contexts/imsi-310310140000145:5/modify.

Session management node 114 sends message 516, Session_Modification_Request, to packet routing node 117, which responds with message 518, Session_Modification_Response. Session management node 114 then sends message 520 to mobility node 113 to alert mobility node 113 that user plane session 106 is being established. Mobility node 113 alerts UE 102 with message 522, and user plane session 106 is established as default bearer 108a and carries data traffic 128.

Figure 6:
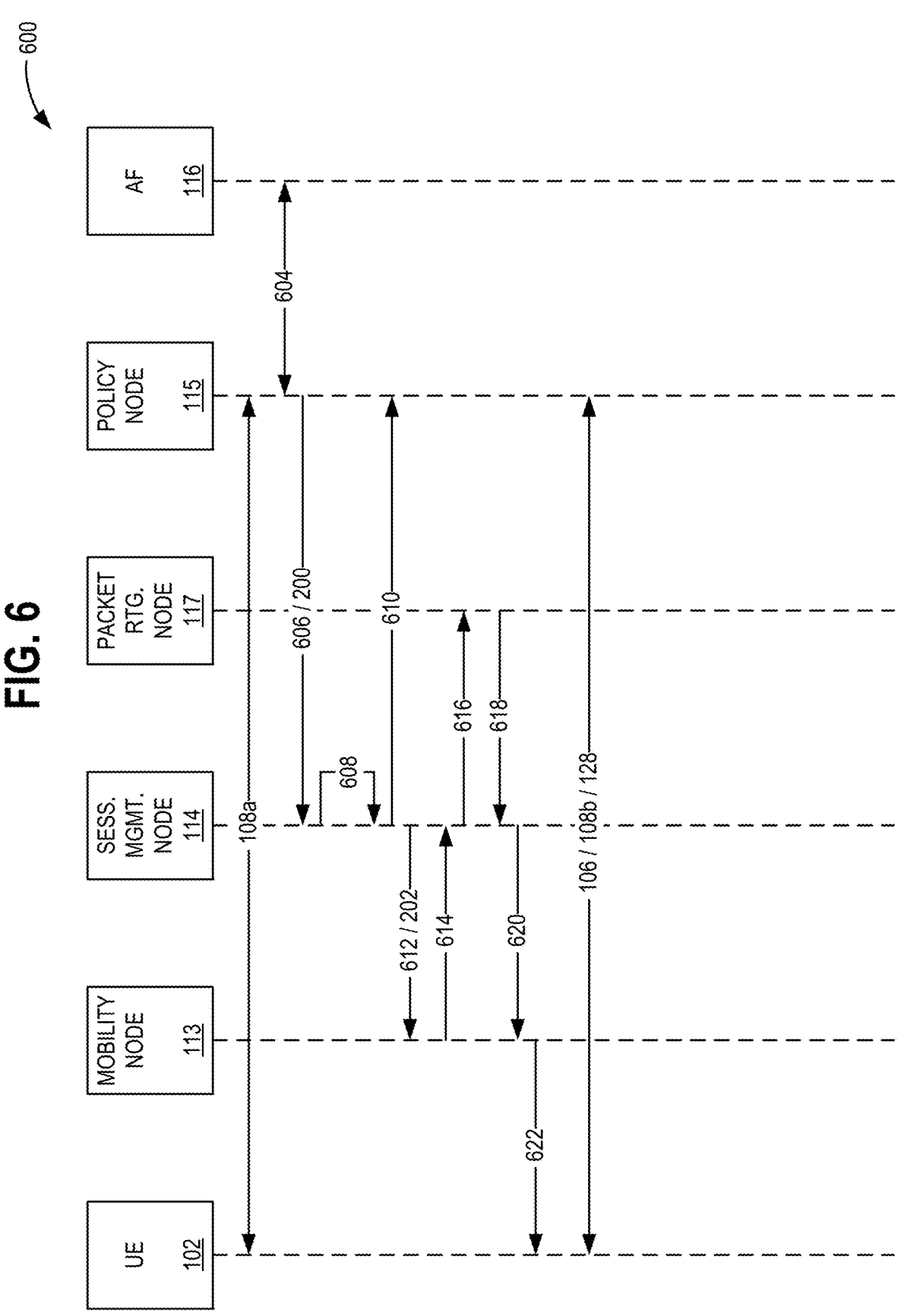

FIG. 6 illustrates an exemplary message sequence diagram 600 that matches the case of FIG. 4B, in which message 200 is an N7 Update Notification. Message sequence diagram 600 commences with default bearer 108a already in place. Policy node 115 queries AF 116 for session information, which is shown as message 604. If this communication is interrupted, this may be the cause of session parameter 210 missing. Policy node 115 sends message 606, which is message 200 in this scenario, to session management node 114, and which is/callbacks/v1/smPoliciesUpdateNotification/imsi-<imis>/update.

Session management node 114 uses failure handler 300 in operation 608 to determine value 212. Session management node 114 then responds to policy node 115 with message 610, which is 200 OK. Session management node 114 sends message 612, which in this scenario is message 202, to mobility node 113 as/namf-comm/v1/ue-contexts/imsi-310310140000145/n1-n2-messages. Message 612 may contain "N2msg{ . . . {5qi:1,arp:{priorityLevel:2,preemptCap:NOT_PREEMPT,preemptVuln:PREEM PTABLE} . . . }". Message 614 from mobility node 113 to session management node 114 represents multiple communications, including 200 OK and/nsmf-pdusession/v1/sm-contexts/imsi-310310140000145:5/modify.

Session management node 114 sends message 616, Session_Modification_Request, to packet routing node 117, which responds with message 618, Session_Modification_Response. Session management node 114 then sends message 620 to mobility node 113 to alert mobility node 113 that user plane session 106 is being established. Mobility node 113 alerts UE 102 with message 622, and user plane session 106 is established as dedicated bearer 108b and carries data traffic 128.

Figure 7:
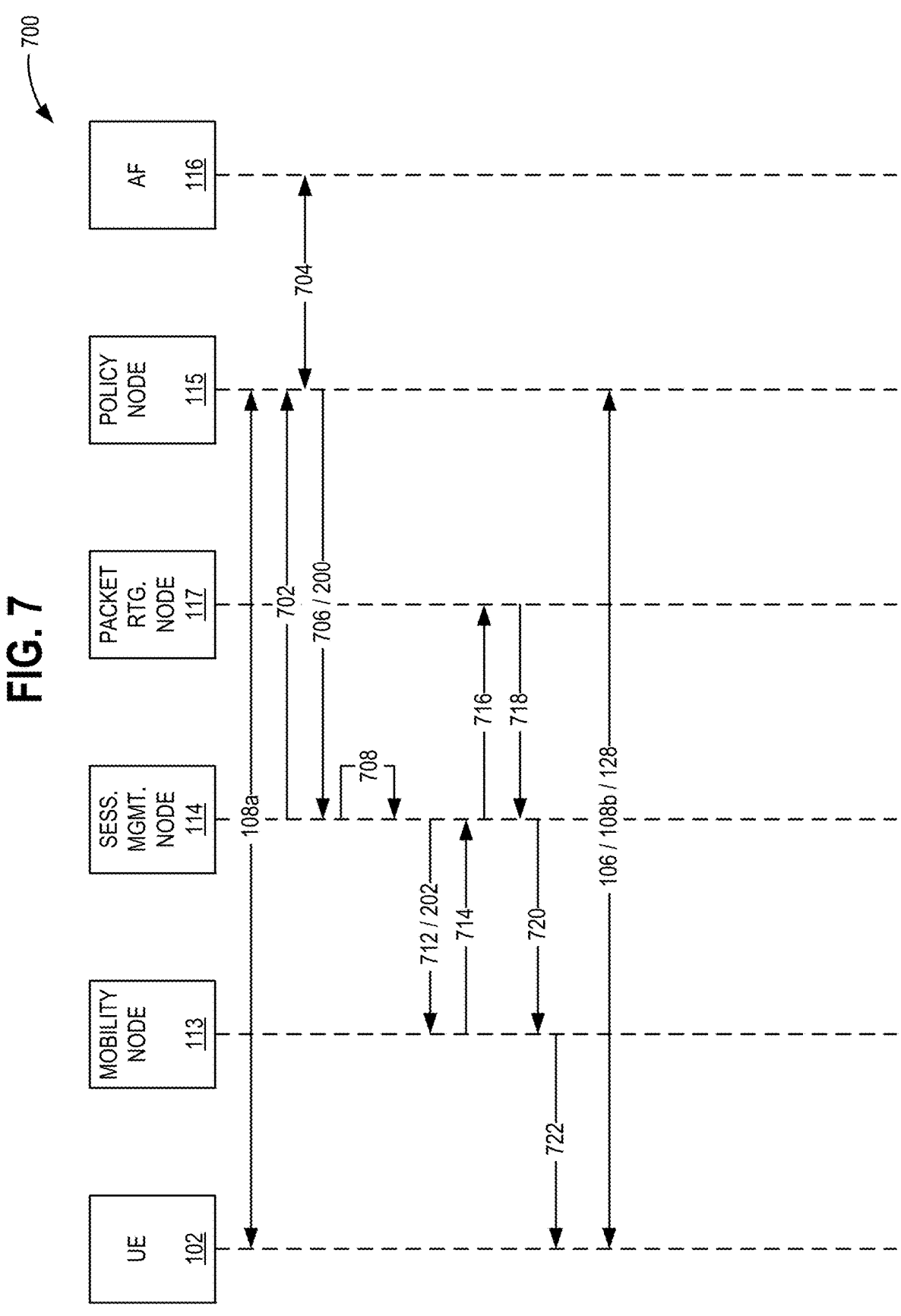

FIG. 7 illustrates an exemplary message sequence diagram 700 that matches the case of FIG. 4C, in which message 200 is an N7 Update Response. Message sequence diagram 700 commences with default bearer 108a already in place. Session management node 114 sends message 702, which is SmPolicyUpdateRequest, to policy node 115. Policy node 115 queries AF 116 for session information, which is shown as message 704. If this communication is interrupted, this may be the cause of session parameter 210 missing. Policy node 115 responds with message 706, which is message 200 in this scenario, to session management node 114, and which is SmPolicyUpdateResponse.

Session management node 114 uses failure handler 300 in operation 708 to determine value 212. Session management node 114 sends message 712, which in this scenario is message 202, to mobility node 113 as/namf-comm/v1/ue-contexts/imsi-310310140000145/n1-n2-messages. Message 712 may contain "N2msg{ . . . {5qi:130,arp:{priorityLevel:12,preemptCap:NOT_PREEMPT,preemptVuln:PRE EMPTABLE} . . . }". Message 714 from mobility node 113 to session management node 114 represents multiple communications, including 200 OK and/nsmf-pdusession/v1/sm-contexts/imsi-310310140000145:5/modify.

Session management node 114 sends message 716, Session_Modification_Request, to packet routing node 117, which responds with message 718, Session_Modification_Response. Session management node 114 then sends message 720 to mobility node 113 to alert mobility node 113 that user plane session 106 is being established. Mobility node 113 alerts UE 102 with message 722, and user plane session 106 is established as dedicated bearer 108b and carries data traffic 128.

Figure 8:
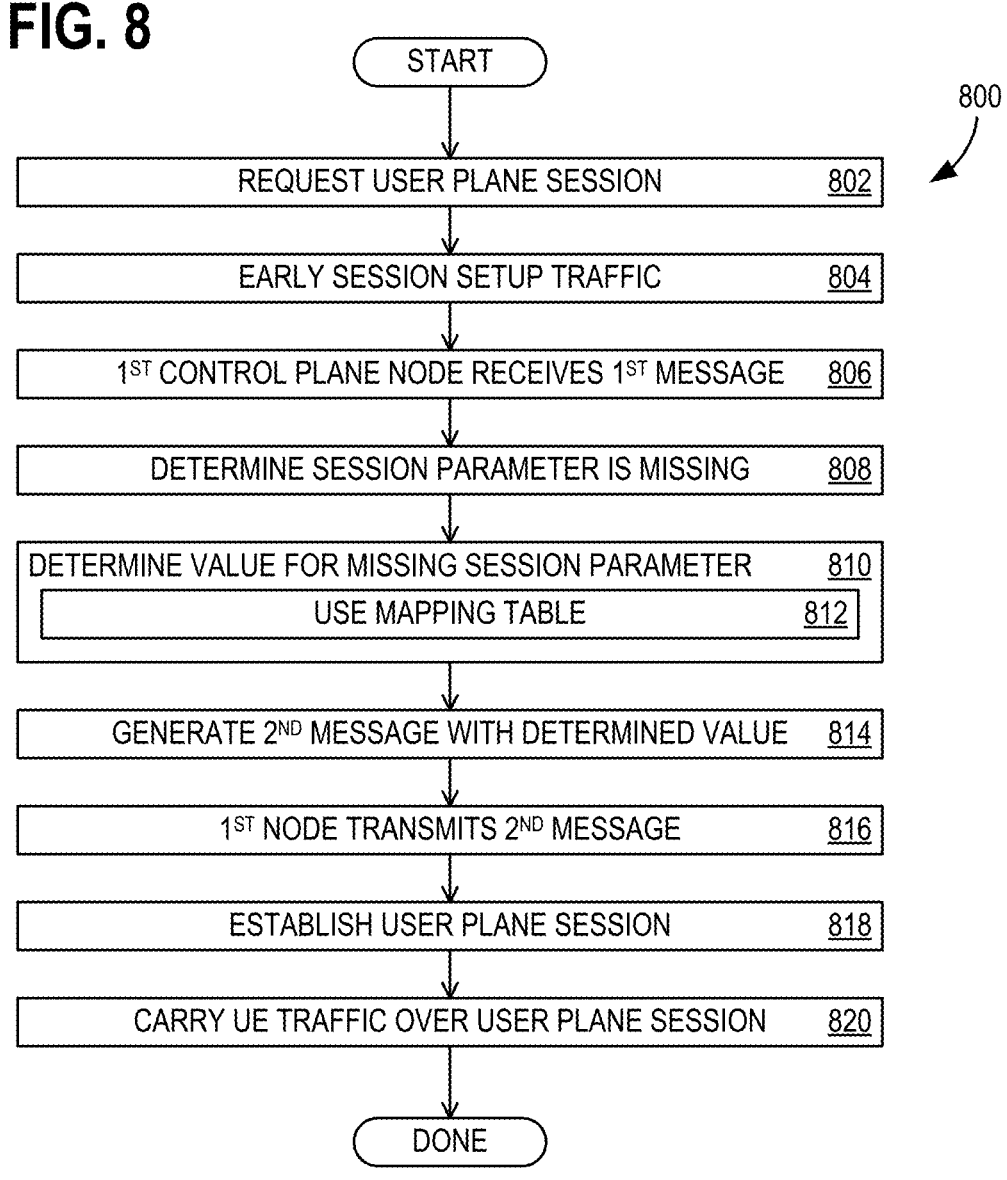

FIG. 8 illustrates a flowchart 800 of exemplary operations associated with architecture 100. In some examples, at least a portion of flowchart 800 may be performed using one or more computing devices 1000 of FIG. 10. Flowchart 800 commences with UE 102 or wireless network 110 attempting to start user plane session 106, in operation 802. Early traffic for setting up user plane session 106, prior to the advent of message 200, as shown in FIGS. 5-7, occur as operation 804.

Session management node 114 (a first control plane node) receives message 200 for establishing user plane session 106 for UE 102, from policy node 115 (a second control plane node), in operation 806. In some examples, message 200 comprises an SBI message, such as an N7 Create Response, an N7 Update Notification, an N7 Update Response, or another type. In some examples, message 200 includes QoS identifier 310, which may be a 5QI or a QCI. In some examples, session management node 114 comprises an SMF or an SAEGW-C, and policy node 115 comprises a PCF or a PCRF.

In operation 808, session management node 114 determines that session parameter 210 is missing from message 200, and in operation 810, session management node 114 determines value 212 for missing session parameter 210. In some examples, session parameter 210 comprises a QoS parameter, such as ARP value 312 or bandwidth value 314. In some examples, operation 810 is performed using operation 812, which uses QoS identifier 310 (that is included in message 200) with mapping table 400 that maps QoS identifier values to values for missing session parameter 210, to determine value 212 for missing session parameter 210. In some examples, mapping table 400 is specific to the type of message 200, and failure handler 300 has a plurality of mapping tables 402-408, with at least some mapping tables being specific to the type of message 200.

Session management node 114 generates message 202 for establishing user plane session 106 in operation 814, with message 202 including determined value 212 for session parameter 210. Session management node 114 transmits message 202 to mobility node 113 (a third control plane node) in operation 816. In some examples, mobility node 113 comprises an AMF or an MME. User plane session 106 is established for UE 102, using session parameter 210, in operation 818, such as default bearer 108a or dedicated bearer 108b. In operation 820, wireless network 110 carries data traffic 128 for UE 102 over user plane session 106.

FIG. 9 illustrates a flowchart 900 of exemplary operations associated with examples of architecture 100. In some examples, at least a portion of flowchart 900 may be performed using one or more computing devices 1000 of FIG. 10. Flowchart 900 commences with operation 902, which includes receiving, by a first control plane node of a wireless network, from a second control plane node of the wireless network, a first message for establishing a user plane session for a UE.

Operation 904 includes determining, by the first control plane node, that a session parameter is missing from the first message. Operation 906 includes determining a value for the missing session parameter. Operation 908 includes transmitting, by the first control plane node, to a third control plane node of the wireless network, a second message for establishing the user plane session, the second message including the determined value for the session parameter. Operation 910 includes establishing the user plane session for the UE using the determined value for the session parameter.

Figure 10:
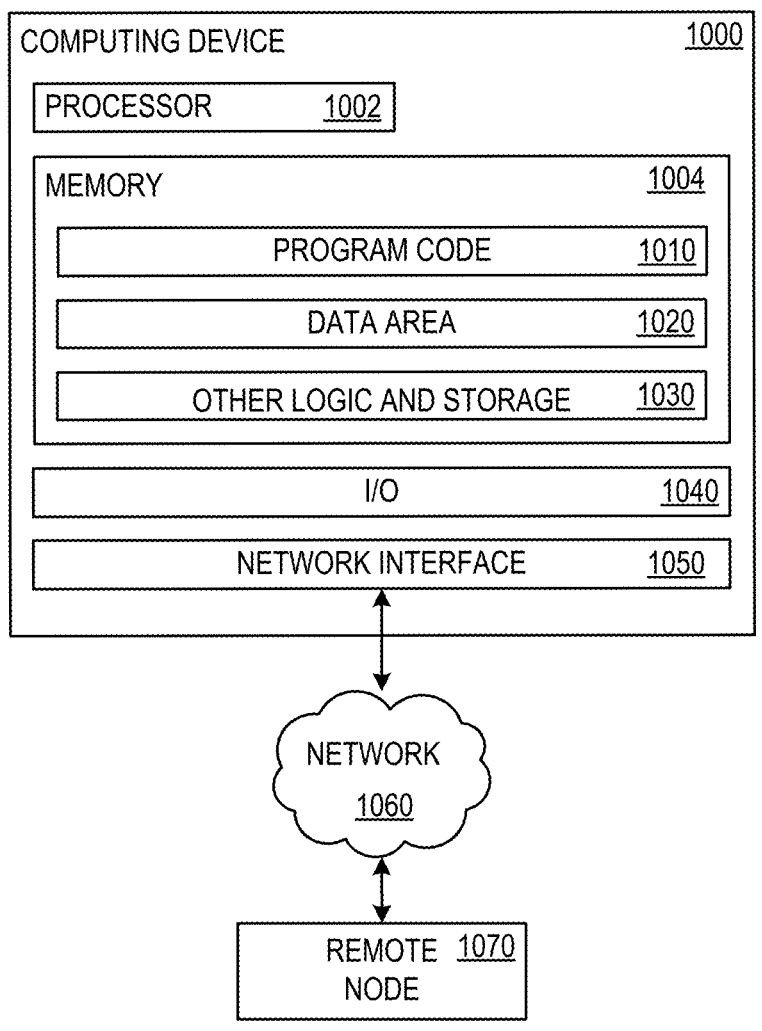
FIG. 10 illustrates a block diagram of a computing device suitable for implementing various aspects of the disclosure.

FIG. 10 illustrates a block diagram of computing device 1000 that may be used as any component described herein that may require computational or storage capacity. Computing device 1000 has at least a processor 1002 and a memory 1004 that holds program code 1010, data area 1020, and other logic and storage 1030. Memory 1004 is any device allowing information, such as computer executable instructions and/or other data, to be stored and retrieved. For example, memory 1004 may include one or more random access memory (RAM) modules, flash memory modules, hard disks, solid-state disks, persistent memory devices, and/or optical disks. Program code 1010 comprises computer executable instructions and computer executable components including instructions used to perform operations described herein. Data area 1020 holds data used to perform operations described herein. Memory 1004 also includes other logic and storage 1030 that performs or facilitates other functions disclosed herein or otherwise required of computing device 1000. An input/output (I/O) component 1040 facilitates receiving input from users and other devices and generating displays for users and outputs for other devices. A network interface 1050 permits communication over external network 1060 with a remote node 1070, which may represent another implementation of computing device 1000. For example, a remote node 1070 may represent another of the above-noted nodes within architecture 100.

ADDITIONAL EXAMPLES

An example system comprises: a processor; and a computer-readable medium storing instructions that are operative upon execution by the processor to: receive, by a first control plane node of a wireless network, from a second control plane node of the wireless network, a first message for establishing a user plane session for a UE; determine, by the first control plane node, that a session parameter is missing from the first message; determine a value for the missing session parameter; transmit, by the first control plane node, to a third control plane node of the wireless network, a second message for establishing the user plane session, the second message including the determined value for the session parameter; and establish the user plane session for the UE using the determined value for the session parameter.

An example method of wireless communication comprises: receiving, by a first control plane node of a wireless network, from a second control plane node of the wireless network, a first message for establishing a user plane session for a UE; determining, by the first control plane node, that a session parameter is missing from the first message; determining a value for the missing session parameter; transmitting, by the first control plane node, to a third control plane node of the wireless network, a second message for establishing the user plane session, the second message including the determined value for the session parameter; and establishing the user plane session for the UE using the determined value for the session parameter.

One or more example computer storage devices has computer-executable instructions stored thereon, which, upon execution by a computer, cause the computer to perform operations comprising: receiving, by a first control plane node of a wireless network, from a second control plane node of the wireless network, a first message for establishing a user plane session for a UE; determining, by the first control plane node, that a session parameter is missing from the first message; determining a value for the missing session parameter; transmitting, by the first control plane node, to a third control plane node of the wireless network, a second message for establishing the user plane session, the second message including the determined value for the session parameter; and establishing the user plane session for the UE using the determined value for the session parameter.

Alternatively, or in addition to the other examples described herein, examples include any combination of the following:

the wireless network comprises a cellular network;

the UE comprises an eMBB or cellular telephone, or an FWA;

carrying data traffic over the user plane session;

the first message comprises an SBI message;

the first control plane node comprises a session management node;

the second control plane node comprises a policy node;

the third control plane node comprises a mobility node;

the first message comprises an N7 Create Response;

the user plane session comprises a default bearer;

the first message comprises an N7 Update Notification;

the first message comprises an N7 Update Response;

the user plane session comprises a dedicated bearer;

determining the value for the missing session parameter comprises using a QoS identifier included in the first message with a mapping table that maps QoS identifier values to values for the missing session parameter;

the session parameter comprises a QoS parameter;

the QoS parameter comprises an ARP value;

the QoS parameter comprises a bandwidth value;

the first control plane node determines the value for the missing session parameter;

the first control plane node generates the second message;

the session management node comprises an SMF or an SAEGW-C;

the policy node comprises a PCF or a PCRF;

the mobility node comprises an AMF or an MME;

the QoS identifier comprises a 5QI;

the QoS identifier comprises a QCI;

the mapping table is specific to a type of the first message; and the failure handler has a plurality of mapping tables, at least some mapping tables specific to a type of the first message.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

receiving, by a session management node of a wireless network, from a policy node of the wireless network, a first service-based interface (SBI) message for establishing a user plane session for a user equipment (UE);

parsing, by the session management node, the first SBI message;

determining, by the session management node, that a session parameter is missing from the first SBI message;

determining, by the session management node, a value for the missing session parameter;

generating, by the session management node, a second SBI message for establishing the user plane session, the second SBI message including the value for the missing session parameter;

transmitting, by the session management node, to a mobility node of the wireless network, the second SBI message for establishing the user plane session; and establishing the user plane session for the UE using the second SBI message.

2. The method of claim 1, wherein the first SBI message comprises an N7 Create Response; and wherein the user plane session comprises a default bearer.

3. The method of claim 1, wherein the first SBI message comprises an N7 Update Notification or an N7 Update Response, and wherein the user plane session comprises a dedicated bearer.

4. The method of claim 1, wherein determining the value for the missing session parameter comprises:

using a quality of service (QoS) identifier included in the first SBI message with a mapping table that maps QoS identifier values to values for the missing session parameter.

5. The method of claim 1, wherein the session parameter comprises a quality of service (QoS) parameter.

6. The method of claim 5, wherein the QoS parameter comprises an allocation and retention priority (ARP) value or a bandwidth value.

7. A system comprising:

a processor; and a computer-readable medium storing programing instructions for execution by the processor, the programming instructions, upon execution by the processor, causing the system to perform the following operations:

receiving, by a session management node of a wireless network, from a policy node of the wireless network, a first service-based interface (SBI) message for establishing a user plane session for a user equipment (UE);

parsing, by the session management node, the first SBI message;

determining, by the session management node, that a session parameter is missing from the first SBI message;

determining, by the session management node, a value for the missing session parameter;

generating at the session management node, a second SBI message for establishing the user plane session, the second SBI message including the value for the missing session parameter;

transmitting, by the session management node, to a mobility node of the wireless network, the second SBI message for establishing the user plane session; and establishing the user plane session for the UE using the second SBI message.

8. The system of claim 7, wherein the SBI first message comprises an N7 Create Response, and wherein the user plane session comprises a default bearer.

9. The system of claim 7, wherein determining the value for the missing session parameter comprises:

using a quality of service (QoS) identifier included in the first message with a mapping table that maps QoS identifier values to values for the missing session parameter.

10. The system of claim 7, wherein the session parameter comprises a quality of service (QoS) parameter and an allocation & retention priority (ARP) value.

11. One or more computer storage devices having computer-executable instructions stored thereon, which, upon execution by a computer, cause the computer to perform operations comprising:

receiving, by a session management node of a wireless network, from a policy node of the wireless network, a first service-based interface (SBI) message for establishing a user plane session for a user equipment (UE);

parsing, by the session management node, the first SBI message;

determining, by the session management node, that a session parameter is missing from the first SBI message;

determining, by the session management node, a value for the missing session parameter;

generating at the session management node, a second SBI message for establishing the user plane session, the second SBI message including the value for the missing session parameter;

transmitting, by the session management node, to a mobility node of the wireless network, the second SBI message for establishing the user plane session; and establishing the user plane session for the UE using the second SBI message.

12. The one or more computer storage devices of claim 11, wherein the first SBI message comprises an N7 Create Response, and wherein the user plane session comprises a default bearer.

13. The one or more computer storage devices of claim 11, wherein determining the value for the missing session parameter comprises:

using a quality of service (QoS) identifier included in the SBI first message with a mapping table that maps QoS identifier values to values for the missing session parameter.

14. The one or more computer storage devices of claim 13, wherein the QoS identifier comprises a fifth generation (5G) QoS identifier (5QI), and wherein the mapping table is specific to a type of the first SBI message.

15. The one or more computer storage devices of claim 11, wherein the session parameter comprises a quality of service (QoS) parameter and an allocation & retention priority (ARP) value.

16. The system of claim 7, wherein the SBI first message comprises an N7 Update Notification or an N7 Update Response, and wherein the user plane session comprises a dedicated bearer.

17. The system of claim 7, wherein the session parameter comprises a quality of service (QoS) parameter and a bandwidth value.

18. The one or more computer storage devices of claim 11, wherein the SBI first message comprises an N7 Update Notification or an N7 Update Response, and wherein the user plane session comprises a dedicated bearer.

19. The one or more computer storage devices of claim 11, wherein the session parameter comprises a quality of service (QoS) parameter and a bandwidth value.

\* \* \* \* \*